US009402130B2

(12) United States Patent
Maruko

(10) Patent No.: US 9,402,130 B2
(45) Date of Patent: Jul. 26, 2016

(54) WIND NOISE REDUCING CIRCUIT

(71) Applicant: ROHM CO., LTD., Kyoto (JP)

(72) Inventor: Tsuguto Maruko, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 295 days.

(21) Appl. No.: 14/025,326

(22) Filed: Sep. 12, 2013

(65) Prior Publication Data

US 2014/0079245 A1 Mar. 20, 2014

(30) Foreign Application Priority Data

Sep. 14, 2012 (JP) ................................ 2012-203270

(51) Int. Cl.
*H04B 15/00* (2006.01)
*H04R 3/00* (2006.01)

(52) U.S. Cl.
CPC ................ *H04R 3/002* (2013.01); *H04R 3/005* (2013.01); *H04R 2410/07* (2013.01)

(58) Field of Classification Search
CPC ....... H04R 3/002; H04R 3/00; H04R 2410/07
USPC ........................................................ 381/94.7
See application file for complete search history.

(56) References Cited

U.S. PATENT DOCUMENTS

| | | | | |
|---|---|---|---|---|
| 5,550,925 A * | 8/1996 | Hori et al. | 381/98 |
| 2005/0237083 A1* | 10/2005 | Bakker et al. | 326/47 |
| 2008/0212794 A1* | 9/2008 | Ikeda | 381/94.1 |
| 2009/0175466 A1* | 7/2009 | Elko et al. | 381/94.2 |

FOREIGN PATENT DOCUMENTS

JP 10126878 A 5/1998

* cited by examiner

*Primary Examiner* — Davetta W Goins
*Assistant Examiner* — Daniel Sellers
(74) *Attorney, Agent, or Firm* — Cantor Colburn LLP

(57) ABSTRACT

A high-pass filter is configured to remove a low-pass filter component of a first channel audio signal and a low-pass filter component of a second channel audio signal. A control unit is configured to detect a wind noise magnitude based on at least one from among the first channel audio signal and the second channel audio signal, and to increase a cutoff frequency of the high-pass filter according to an increase in the wind noise magnitude thus detected. The control unit is configured to set the cutoff frequency of the high-pass filter to a predetermined minimum value $f_{MIN}$ when the wind noise magnitude thus detected is smaller than a predetermined minimum value, and to gradually increase the cutoff frequency when the wind noise magnitude becomes greater than the minimum value.

39 Claims, 10 Drawing Sheets

WIND NOISE REDUCING CIRCUIT

CROSS REFERENCE TO RELATED APPLICATION

The present invention claims priority under 35 U.S.C. §119 to Japanese Application No. 2012-203270 filed Sep. 14, 2012, the entire content of which is incorporated herein by reference.

BACKGROUND OF THE INVENTION

1. Field of the Invention

The present invention relates to audio signal processing.

2. Description of the Related Art

An audio recording function is implemented in various kinds of electronic devices such as digital video cameras, digital still cameras, cellular phone terminals, and personal computers. When audio recording is performed using such an electronic device having an audio recording function in an environment in which wind is blowing, such an arrangement has a problem of noise in the recorded audio data, which is referred to as "wind noise". In order to solve such a problem, an arrangement is known in which a wind shield is provided to a microphone, which reduces such wind noise to a certain extent. As another approach, wind noise reducing techniques using signal processing have been proposed (Patent document 1).

The wind frequency spectrum is concentrated in a range that is equal to or lower than 1 kHz. Thus, with conventional techniques, detection of whether or not wind noise occurs is made based on the frequency spectrum acquired by means of a microphone. When wind noise is detected, the L-channel audio signal and the R-channel audio signal are passed through a high-pass filter, so as to reduce the wind noise spectrum component that is equal to or lower than the cutoff frequency of the high-pass filter. A related art has been disclosed in Japanese Patent Application Laid Open No. H10-126878.

The present inventors have investigated such a technique in which the cutoff frequency of such a high-pass filter is controlled according to the magnitude of the wind noise, and have come to recognize the following problems.

In a range in which the magnitude of the wind noise is smaller than a predetermined minimum value, the cutoff frequency of the high-pass filter is set to a predetermined minimum value so as to substantially disable the high-pass filter. With such an arrangement, when the magnitude of the wind noise becomes greater than the predetermined minimum value, the cutoff frequency of the high-pass filter is raised at a predetermined rate.

Such a control operation has a problem of discontinuous change in the rate at which the cutoff frequency is changed at the time point at which the cutoff frequency fc becomes grater than the predetermined minimum value $f_{MIN}$. Thus, when the magnitude of the wind noise changes such that it straddles the predetermined minimum value, this leads to a sudden change in the cutoff frequency fc, which causes the user to experience auditory discomfort.

SUMMARY OF THE INVENTION

The present invention has been made in view of such a situation. Accordingly, it is an exemplary purpose of an embodiment of the present invention to provide a wind noise reducing circuit configured to remove wind noise while reducing auditory discomfort experienced by the user.

An embodiment of the present invention relates to a wind noise reducing circuit configured to receive a first channel audio signal acquired via a first channel microphone and a second channel audio signal acquired via a second channel microphone. The wind noise reducing circuit comprises: a high-pass filter configured to reduce a low-frequency component of the first channel audio signal and a low-frequency component of the second channel audio signal; and a control unit configured to detect a wind noise magnitude based on at least one from among the first channel audio signal and the second channel audio signal, and to raise a cutoff frequency of the high-pass filter according to an increase in the wind noise magnitude thus detected. The control unit is configured to set the cutoff frequency of the high-pass filter to a predetermined minimum frequency $f_{MIN}$ when the wind noise magnitude is smaller than a predetermined minimum value MIN. Furthermore, the control unit is configured to gradually raise the cutoff frequency when the wind noise magnitude becomes greater than the minimum value MIN.

Another embodiment of the present invention also relates to a wind noise reducing circuit. The wind noise reducing circuit comprises: a high-pass filter configured to reduce a low-frequency component of a first channel audio signal and a low-frequency component of a second channel audio signal; and a control unit configured to detect a wind noise magnitude based on at least one from among the first channel audio signal and the second channel audio signal, and to raise a cutoff frequency of the high-pass filter according to an increase in the wind noise magnitude thus detected. The control unit is configured to set the cutoff frequency of the high-pass filter to a predetermined minimum frequency $f_{MIN}$ when the wind noise magnitude is smaller than a predetermined minimum value MIN. Furthermore, the control unit is configured to monotonically increase the cutoff frequency, and to increase the slope of the cutoff frequency from zero when the wind noise magnitude becomes greater than the minimum value MIN.

Yet another embodiment of the present invention also relates to a wind noise reducing circuit. The wind noise reducing circuit comprises: a high-pass filter configured to reduce a low-frequency component of a first channel audio signal and a low-frequency component of a second channel audio signal; and a control unit configured to detect a wind noise magnitude based on at least one from among the first channel audio signal and the second channel audio signal, and to raise a cutoff frequency of the high-pass filter according to an increase in the wind noise magnitude thus detected. The control unit is configured to set the cutoff frequency of the high-pass filter to a predetermined minimum frequency $f_{MIN}$ when the wind noise magnitude is smaller than a predetermined minimum value MIN. Furthermore, the control unit is configured to increase the cutoff frequency in a quadratic function manner according to the wind noise magnitude when the wind noise magnitude becomes greater than the minimum value MIN.

With such embodiments, the cutoff frequency is gradually changed even when the wind noise magnitude changes and straddles the predetermined minimum value. Thus, such an arrangement is capable of reducing auditory discomfort experienced by the user.

Yet another embodiment relates to an audio signal processing circuit. The audio signal processing circuit comprises: a first amplifier configured to amplify an output signal of a first channel microphone; a second amplifier configured to amplify an output signal of a second channel microphone; a first A/D converter configured to convert an output signal of the first amplifier into a first channel audio signal in the form of a digital signal; a second A/D converter configured to convert an output signal of the second amplifier into a second channel audio signal in the form of a digital signal; any one of the aforementioned wind noise reducing circuits, configured to receive the first channel audio signal and the second channel audio signal, and to reduce a wind noise; and a digital signal processing unit configured to perform predetermined signal processing on the first channel audio signal and the second channel audio signal after they pass through the wind noise reducing circuit.

Yet another embodiment of the present invention relates to an electronic device. The electronic device may comprise any one of the aforementioned audio signal processing circuits.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

First Embodiment

Figure 1:
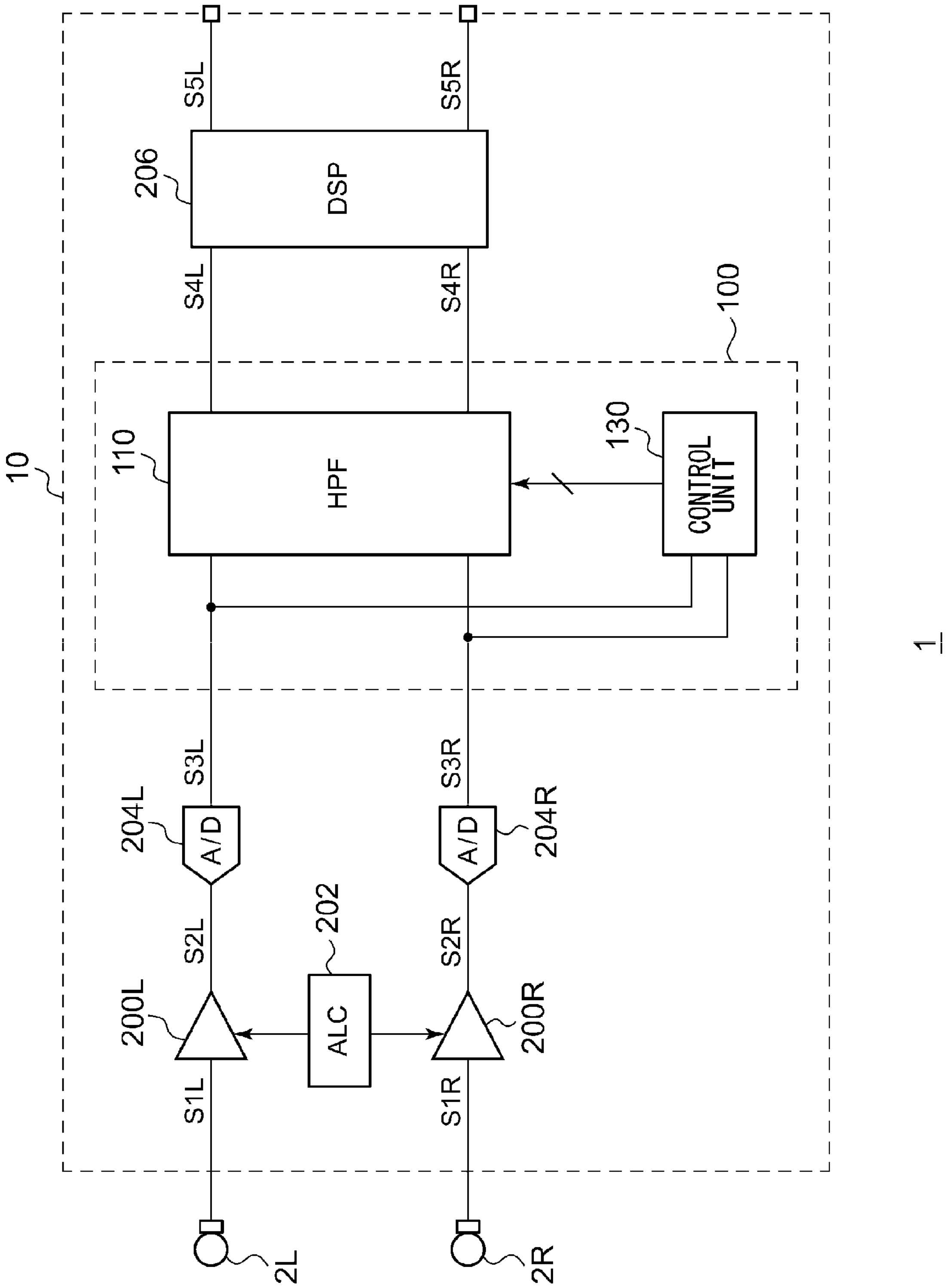
FIG. 1 is a block diagram showing a configuration of an electronic device including a wind noise reducing circuit according to a first embodiment.

FIG. 1 is a block diagram showing a configuration of an electronic device 1 including a wind noise reducing circuit 100 according to a first embodiment. The electronic device 1 includes an L-channel microphone 2L, an R-channel microphone 2R, and an audio signal processing circuit 10.

The first microphone (L-channel microphone) 2L and the second microphone (R-channel microphone) 2R are each configured to convert an acoustic signal into analog electrical signals (audio signals) S1L and S1R, respectively. The audio signal processing circuit 10 is configured to receive the audio signals S1L and S1R, to remove noise included in the audio signals, to perform predetermined signal processing on the audio signals S1L and S1R, and to supply the audio signals S1L and S1R thus subjected to signal processing to a downstream circuit (shown).

The audio signal processing circuit 10 includes a wind noise reducing circuit 100, a first amplifier (L-channel amplifier) 200L, a second amplifier (R-channel amplifier) 200R, an automatic level controller 202, a first A/D converter (L-channel A/D converter) 204L, a second A/D converter (R-channel A/D converter) 204R, and a digital signal processing unit 206.

The L-channel amplifier 200L is configured to amplify the L-channel audio signal S1L. The R-channel amplifier 200R is configured to amplify the R-channel audio signal S1R. The automatic level controller 202 is configured to control the gain of the L-channel amplifier 200L and the gain of the R-channel amplifier 200R so as to maintain the volume at a constant level.

The L-channel A/D converter 204L is configured to perform analog/digital conversion of the output S2L of the L-channel amplifier 200L, so as to generate an L-channel digital audio signal S3L. Similarly, the R-channel A/D converter 204R is configured to perform analog/digital conversion of the output S2R of the R-channel amplifier 200R, so as to generate an R-channel digital audio signal S3R.

The wind noise reducing circuit 100 is configured to receive the L-channel audio signal S3L and the R-channel audio signal S3R, and to remove the wind noise component from the L-channel audio signal S3L and the R-channel audio signal S3R thus received. The digital signal processing unit 206 is configured to perform predetermined signal processing on the audio signals S4L and S4R after the wind noise has been removed, thereby generating the audio signals S5L and S5R.

The above is the overall configuration of the electronic device 1. Next, description will be made regarding the configuration of the wind noise reducing circuit 100.

The wind noise reducing circuit 100 includes a high-pass filter 110 and a control unit 130. The high-pass filter 110 is configured to remove a low frequency component from the L-channel (first channel) audio signal S3L and the R-channel audio signal S4R. The high-pass filter 110 is configured to have a variable cutoff frequency fc.

The control unit 130 is configured to generate a difference component (S3L−S3R) which is the difference between the L-channel audio signal S3L and the R-channel audio signal S3R, and to control the cutoff frequency fc set for the high-pass filter 110 according to the difference component (S3L−S3R) thus generated. It is needless to say that the difference (S3R−S3L) may also be employed as the aforementioned difference component. Specifically, the cutoff frequency fc set for the high-pass filter 110 is raised according an increase in the level (amplitude) of the difference component (S3L−S3R).

The above is the basic configuration of the wind noise reducing circuit 100. Next, description will be made regarding the operation of the wind noise reducing circuit 100.

Description will be made below assuming an imaginary sound source. With the distance between the sound source and the L-channel microphone 2L as DL, and with the distance between the sound source and the R-channel microphone 2R as DR, the audio signal S1L acquired by the microphone 2L and the audio signal S1R acquired by the microphone 2R are determined by the difference between the distance DL and the distance DR, which is represented by (DL−DR), and the wavelength of the audio signal.

On an empirical basis, wind noise has a frequency range between 100 Hz and 400 Hz. In contrast, in many cases, the dominant frequency component of an audio signal of interest to be recorded using a microphone is higher than that of wind noise. As the frequency of the audio signal becomes higher, the phase difference in the audio signal between the L channel and the R channel becomes negligible, and thus, the in-phase component becomes large. By calculating the difference (S3L−S3R) between the L-channel audio signal S3L and the R-channel audio signal S3R, such an arrangement cancels out the audio signal of interest having a large in-phase component. That is to say, the difference (S3L−S3R) thus calculated contains, as a dominant component, the wind noise having a large difference component.

Figure 2:
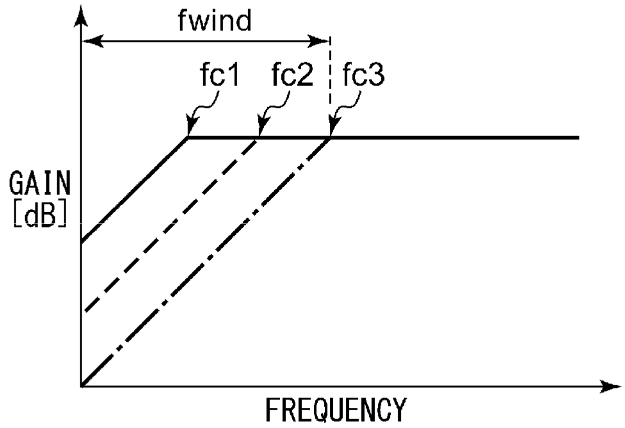
FIG. 2 is a diagram showing the frequency characteristics of a high-pass filter.

FIG. 2 is a diagram showing the frequency characteristics of the high-pass filter 110. As the amplitude of the difference component (S3L−S3R) becomes great, the cutoff frequency fc is raised in the direction toward fc1, fc2, and fc3. The frequency spectrum of the wind noise is within the range fwind.

As the amplitude of the difference component (S3L−S3R) becomes greater, i.e., as the magnitude of the wind noise becomes greater, the cutoff frequency fc of the high-pass filter 110 is raised. As a result, the pass-through gain of the frequency band fwind of the wind noise falls.

Figure 3A:
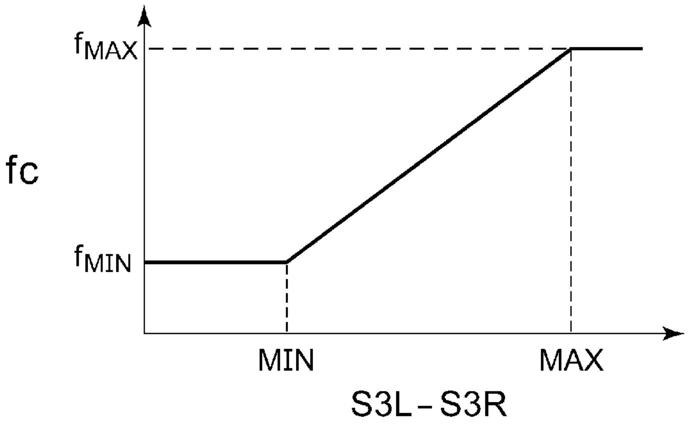
FIGS. 3A and 3B are diagrams each showing the relation between the amplitude of the difference component and the cutoff frequency set for the high-pass filter.
Figure 3B:
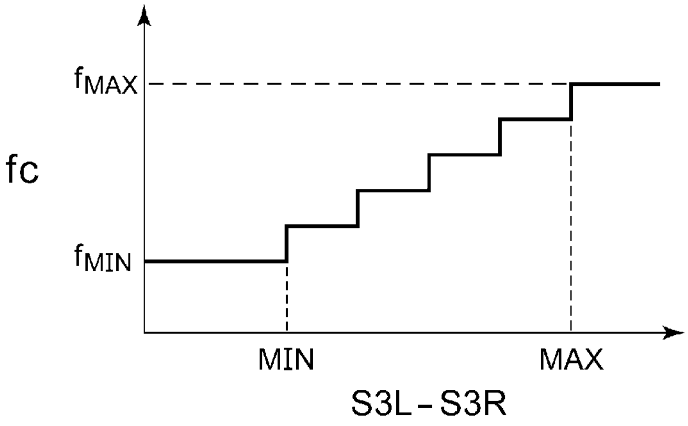

FIGS. 3A and 3B are diagrams each showing the relation between the amplitude of the difference component and the cutoff frequency fc set for the high-pass filter 110. The horizontal axis represents the amplitude of the difference component (S3L−S3R), i.e., the magnitude of the wind noise. The vertical axis represents the cutoff frequency fc. FIG. 3A shows an example of the cutoff frequency fc set for the high-pass filter 110 in which the cutoff frequency fc is set to a predetermined minimum value $f_{MIN}$ when the amplitude of the difference component is smaller than a predetermined minimum value MIN, and is set to a predetermined maximum value $f_{MAX}$ when the amplitude of the difference component is greater than a predetermined maximum value MAX, and is continuously changed in a linear manner when the amplitude of the difference component is within a range between the minimum value MIN and the maximum value MAX.

With an example shown in FIG. 3B, when the amplitude of the difference component is within the range between the minimum value MIN and the maximum value MAX, the cutoff frequency fc is changed in a stepwise manner.

With the wind noise reducing circuit 100 shown in FIG. 1, such an arrangement is capable of appropriately detecting the presence or absence of the wind noise, or otherwise the magnitude of the wind noise. Furthermore, such an arrangement is capable of appropriately controlling the cutoff frequency fc set for the high-pass filter 110 based on the detection result thus obtained.

The configurations of the high-pass filter 110 and the control unit 130 are not restricted in particular. Description will be made regarding example configurations of the high-pass filter 110 and the control unit 130.

Figure 4:
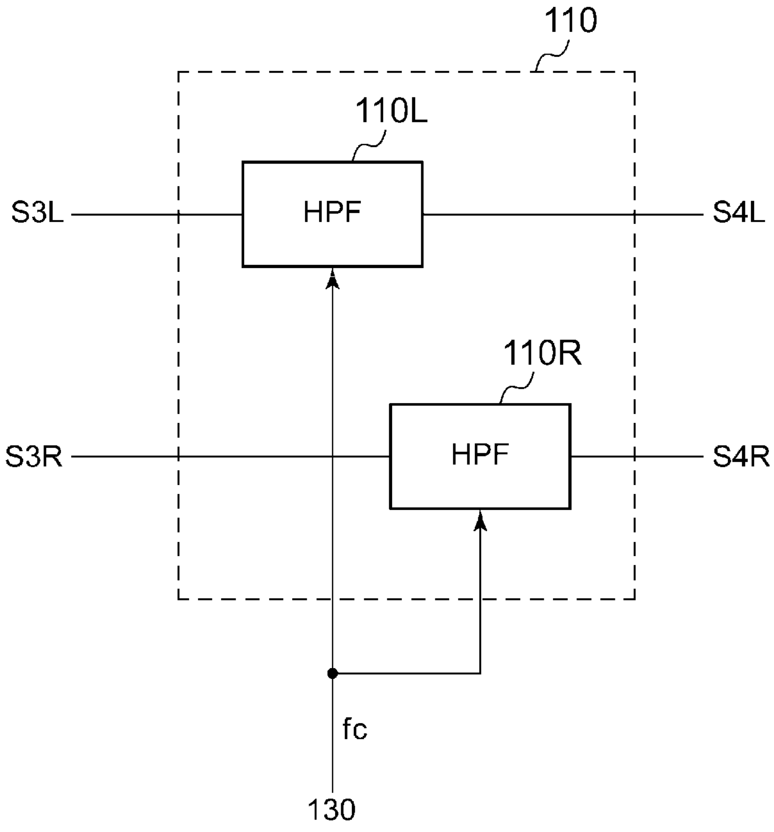
FIG. 4 is a block diagram showing an example configuration of the high-pass filter.

FIG. 4 is a block diagram showing an example configuration of the high-pass filter 110. The high-pass filter 110 shown in FIG. 4 includes: an L-channel high-pass filter 110L configured to remove a low-frequency component of the L-channel audio signal S3L; and an R-channel high-pass filter 110R configured to remove a low-frequency component of the R-channel audio signal S3R. The control circuit 130 is configured to set the cutoff frequency fc of the high-pass filter 110R and the cutoff frequency fc of the high-pass filter 110L to the same value.

Figure 5:
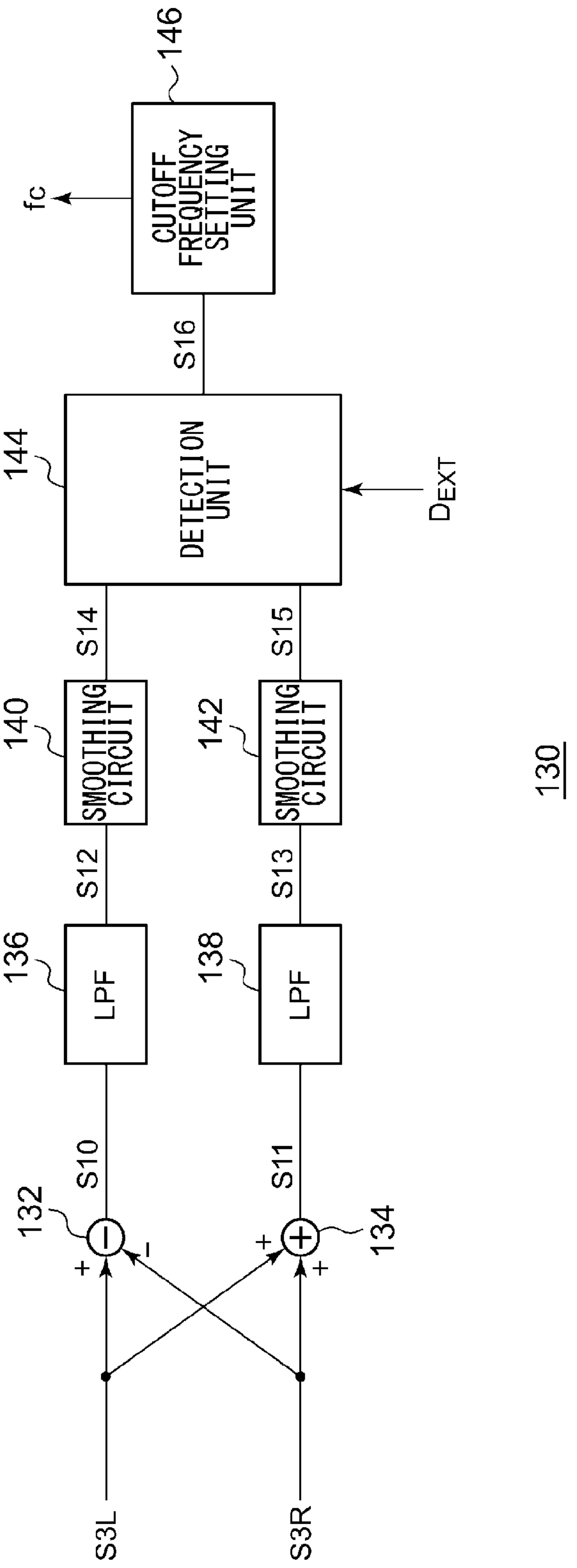
FIG. 5 is a block diagram showing an example configuration of a control unit.

FIG. 5 is a block diagram showing an example configuration of the control unit 130.

The control unit 130 includes a detection subtractor 132, a detection adder 134, a first low-pass filter 136, a second low-pass filter 138, a first smoothing circuit 140, a second smoothing circuit 142, a detection unit 144, and a cutoff frequency setting unit 146.

The detection subtractor 132 is configured to generate a subtraction component S10 (=S3L−S3R) which is the difference between the L-channel audio signal S3L and the R-channel audio signal S3R. As described above, the control unit 130 is configured to detect the presence or absence of the wind noise, or otherwise the magnitude of the wind noise, based on the difference component S10 thus generated, and to control the cutoff frequency fc of the high-pass filter 110.

In order to provide higher-precision wind noise detection, the control unit 130 shown in FIG. 5 is configured to perform a control operation which is also based on a sum component, in addition to the difference component.

The detection adder 134 is configured to generate a sum component S11 (=S3L+S3R) which is the sum of the L-channel audio signal S3L and the R-channel audio signal S3R. The control unit 130 is configured to control the cutoff frequency fc of the high-pass filter 110 based on the ratio between the difference component S10 and the sum component S11, i.e., S10/S11=(S3L−S3R)/(S3L+S3R).

The difference component S10 is input to the detection unit 144 via the first low-pass filter 136 and the first smoothing circuit 140. The sum component S11 is input to the detection unit 144 via the second low-pass filter 138 and the second smoothing circuit 142. The detection unit 144 is configured to calculate the data S16 (=S14/S15) which represents the ratio between the difference component S14 and the sum component S15. The cutoff frequency setting unit 146 is configured to set the cutoff frequency fc of the high-pass filter 110 according to the data S16.

The cutoff frequency setting unit 146 may include a table indicating the relation between the data S16 and the cutoff frequency fc. Alternatively, the cutoff frequency setting unit 146 may calculate the cutoff frequency fc by inputting the data S16 to a predetermined calculation expression.

Wind noise has a large differential component between the L-channel audio signal and the R-channel audio signal, and has a small in-phase component. In contrast, the audio signal of interest, which has a high-frequency component as a dominant component, has a small differential component between the L-channel audio signal and the R-channel audio signal, and has a large in-phase component. Thus, by calculating the sum component of the L-channel audio signal and the R-channel audio signal, such an arrangement is capable of canceling out the wind noise component, thereby providing the audio signal of interest as a dominant component. That is to say, it can be understood that the sum component S11 corresponds to the magnitude of the audio signal of interest.

Figure 6:
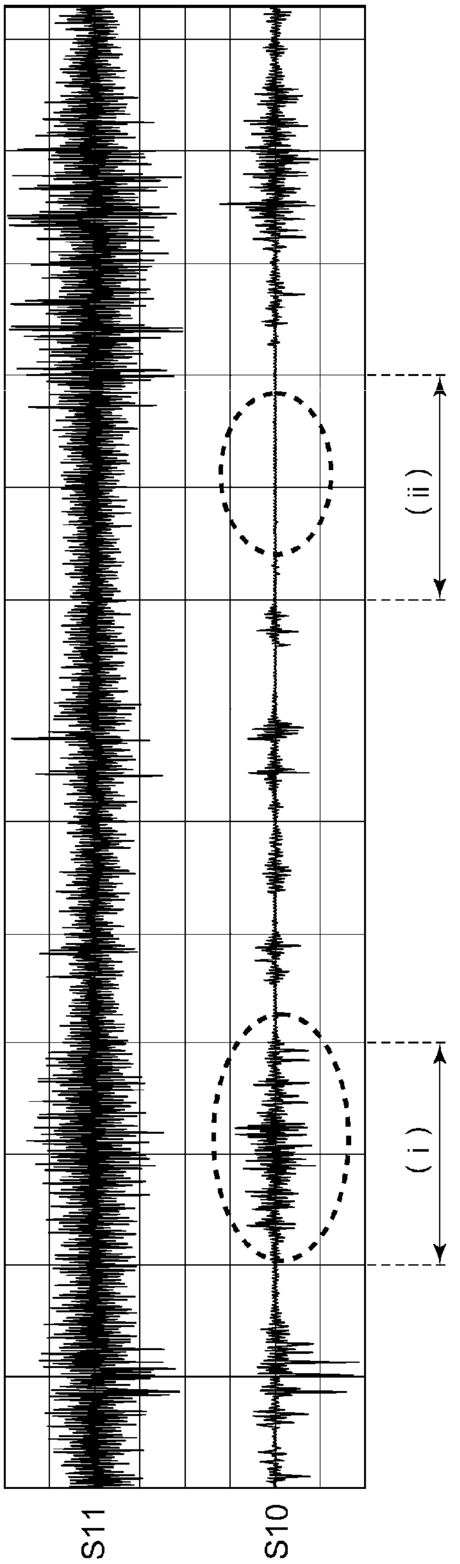
FIG. 6 is a waveform diagram showing the sum component and the difference component.

FIG. 6 is a waveform diagram showing the sum component S11 and the difference component S10. In the period (i), wind noise occurs. In the period (ii), the wind noise is zero. There is no relation between the amplitude of the sum component S11 and the presence or absence of the wind noise or the magnitude of the wind noise. In contrast, the amplitude of the difference component S10 becomes great in the period (i), and becomes small in the period (ii). That is to say, the amplitude of the difference component S10 has a correlation with the magnitude of the wind noise.

With the control unit 130 shown in FIG. 5, by calculating the ratio S10/S11, which is the ratio between the difference component S10 and the sum component S11, such an arrangement is capable of estimating the relative wind noise level with respect to the level of the audio signal of interest. Thus, the control unit 130 is capable of controlling the cutoff frequency fc of the high-pass filter 110 based on the relative wind noise level thus estimated.

The cutoff frequencies of the first low-pass filter 136 and the second low-pass filter 138 are each set to a value on the order of 400 Hz. This allows the wind noise frequency component to pass through. Such low-pass filters 136 and 138 are provided in order to provide high-precision wind noise detection. By providing the low-pass filters 136 and 138, such an arrangement provides higher-precision wind noise detection. Also, the second low-pass filter 138 may be omitted. Also, the first low-pass filter 136 may be omitted.

The first smoothing circuit 140 is configured to calculate the moving average of the difference component S12. As the moving average time becomes greater, i.e., as the number of times the averaging is performed becomes greater, the response speed of the difference component S14 input to the detection unit 144 becomes lower. With such an arrangement including the first smoothing circuit 140, by adjusting the moving average time, such an arrangement is capable of adjusting the sensitivity for sudden wind or weak wind. Such an arrangement is preferably configured to allow the user to set the moving average time via an external microcomputer. Such an arrangement provides an optimum sensitivity according to the situation in which the wind noise reducing circuit 100 is used.

The second smoothing circuit 142 is provided in order to provide a balance between the difference component S14 and the sum component 15. Instead of such a second smoothing circuit 142, a delay circuit may be provided for timing adjustment.

The control unit 130 may be configured to perform a calculation of the data S16 which is also based on an offset value $D_{OFS}$, in addition to the difference component S14 and the sum component S15. The offset value $D_{OFS}$ is preferably set according to a setting value $D_{EXT}$ input via an external microcomputer.

With each electronic device 1 mounting the wind noise reducing circuit 100, there is a difference in the distance between the L-channel microphone 2L and the R-channel microphone 2R. In a case in which the distance between the microphones 2L and 2R is changed, this leads to a change in the amplitude of the difference component S14 thus generated based on the wind noise even if the magnitude of the wind noise is the same. In order to solve such a problem, such an arrangement employs the offset value $D_{OFS}$. By adjusting the offset value $D_{OFS}$ according to the distance between the microphones 2L and 2R, such an arrangement is configured to support various kinds of platforms with differing distances between the microphones.

The offset value $D_{OFS}$ may be set according to the gain g of the L-channel amplifier 200L and the gain g of the R-channel amplifier 200R, in addition to the setting value $D_{EXT}$ input via an external circuit. Such an arrangement is capable of detecting the magnitude of the wind noise based on the data S16' even in a situation in which the gain g of the L-channel amplifier 200L or the gain g of the R-channel amplifier 200R changes.

A change in the gain of such an amplifier leads to a change in the ratio between the difference component and the external setting value and the ratio between the sum component and the external setting value. In order to solve such a problem, by adjusting the offset value according to the gain, such an arrangement is capable of reducing the influence of the gain on the wind noise detection.

Figure 7:
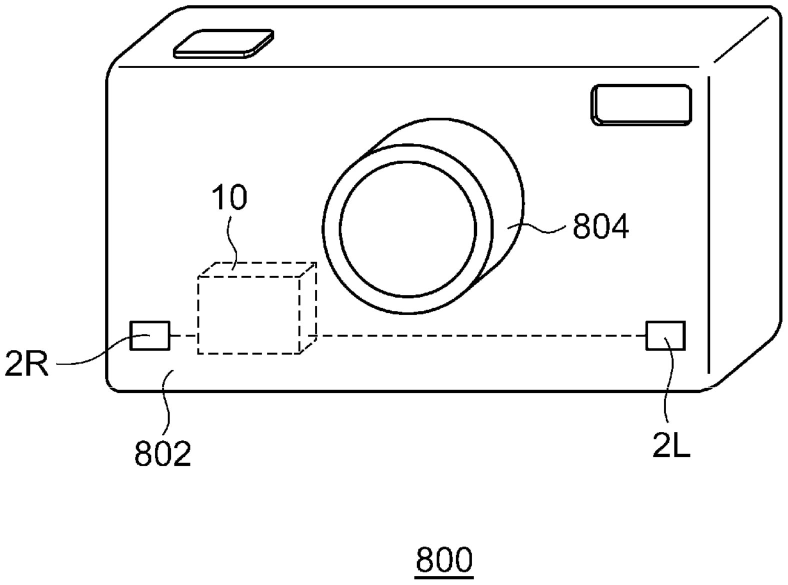
FIG. 7 is a perspective view of an electronic device mounting an audio signal processing circuit.

Next, description will be made regarding the usage of the audio signal processing circuit 10. FIG. 7 is a perspective view showing an electronic device mounting the audio signal processing circuit 10. FIG. 7 shows a digital still camera as an example of such an electronic device.

A digital still camera 800 includes a housing 802, a lens 804, an unshown image pickup element, an image processing processor, and a recording medium. In addition to such components, the digital still camera 800 further includes the L-channel microphone 2L, the R-channel microphone 2R, and the audio signal processing circuit 10.

Other examples of such an electronic device include digital video cameras, voice recorders, cellular phone terminals, PHS (Personal Handyphone System) devices, PDAs (Personal Digital Assistants), tablet PCs (Personal Computers), audio players, and the like.

Second Embodiment

Figure 8:
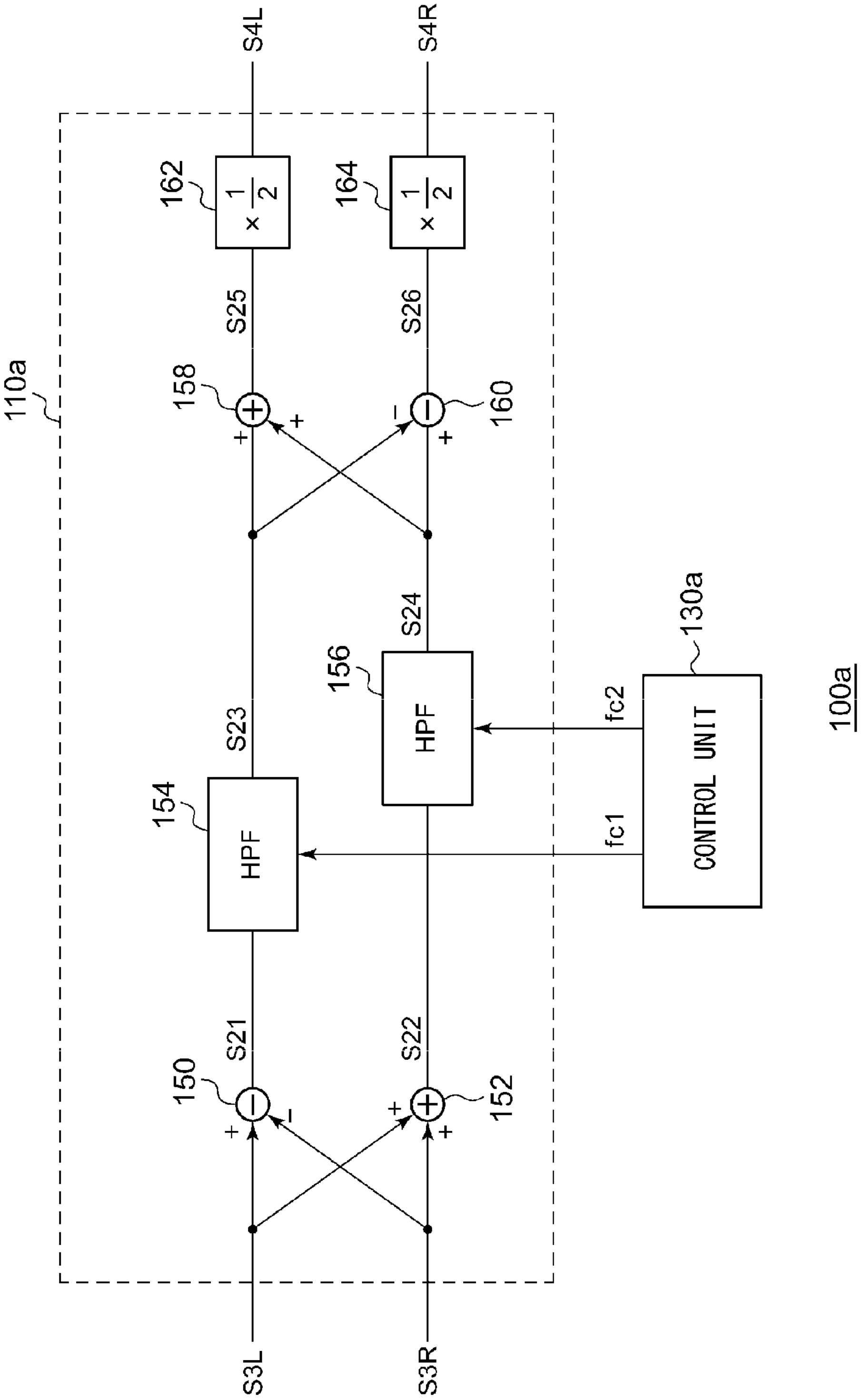
FIG. 8 is a block diagram showing a configuration of a wind noise reducing circuit according to a second embodiment.

FIG. 8 is a block diagram showing a configuration of a wind noise reducing circuit 100*a* according to a second embodiment. The wind noise reducing circuit 100*a* includes a high-pass filter 110*a* and a control unit 130*a*.

The high-pass filter 110*a* includes a first subtractor 150, a first adder 152, a first high-pass filter 154, a second high-pass filter 156, a second adder 158, a second subtractor 160, a first coefficient circuit 162, and a first coefficient circuit 164.

The first subtractor 150 is configured to generate a difference component S21 which is the difference between the L-channel audio signal S3L and the R-channel audio signal S3R. The first adder 152 is configured to generate a sum component S22 which is the sum of the L-channel audio signal S3L and the R-channel audio signal S3R. The first high-pass filter 154 is configured to remove a low-frequency component of the difference component S21 generated by the first subtractor 150. The second high-pass filter 156 is configured to remove a low-frequency component of the sum component S22 generated by the first adder 152. The first high-pass filter 154 and the second high-pass filter 156 are each configured to have respective cutoff frequencies fc1 and fc2 which can be set independently.

The second adder 158 is configured to generate the sum S25 which is the sum of the output S23 of the first high-pass filter 154 and the output S24 of the second high-pass filter 156. The second subtractor 160 is configured to generate the difference S26 between the output S23 of the first high-pass filter 154 and the output S24 of the second high-pass filter 156. The first coefficient circuit 162 and the first coefficient circuit 164 are configured to multiply, by a coefficient of ½, the output S25 of the second adder 158 and the output S26 of the second subtractor 160, respectively.

The control unit 130*a* is configured to detect the wind noise based on at least one of the audio signals S3L and S3R, and to control the cutoff frequency fc1 of the first high-pass filter 154 and the cutoff frequency fc2 of the second high-pass filter 156 based on the detection result.

The wind noise detection method employed in the control unit 130*a* is not restricted in particular. In the same way as with the first embodiment, the wind noise may be detected based on the difference S3L−S3R. In this case, the detection subtractor 132 and the detection adder 134 may be used as the first subtractor 150 and the first adder 152 shown in FIG. 8, respectively.

Alternatively, in the same way as with conventional techniques, the control unit 130*a* may be configured to monitor at least one of the audio signals S3L and S3R, and to detect the wind noise based on a component that is equal to or lower than a predetermined frequency (e.g., 400 Hz), which is a range including the wind noise spectrum, of the audio signal thus monitored.

Figure 9:
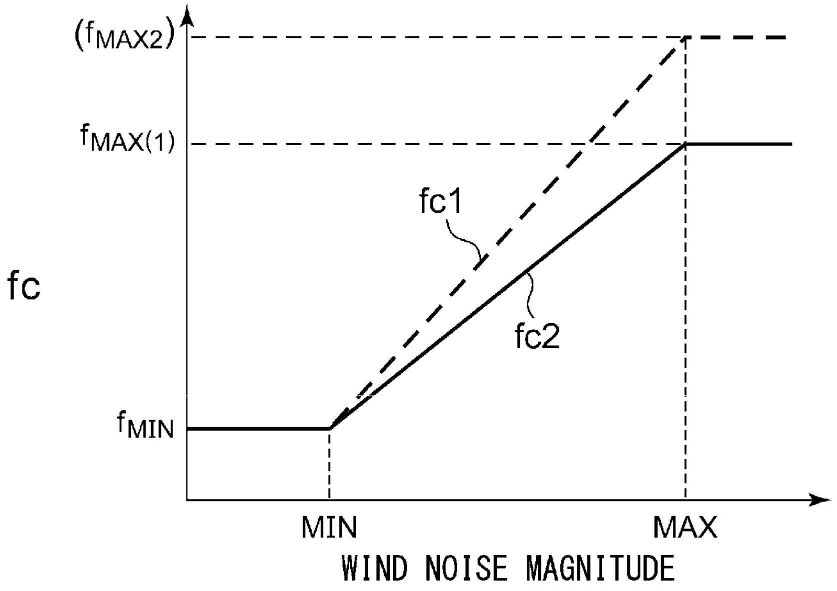
FIG. 9 is a diagram showing the relation between the wind noise magnitude detected by the control unit and the cutoff frequencies set for the first high-pass filter and the second high-pass filter.

FIG. 9 is a diagram showing the relation between the magnitude of the wind noise detected by the control unit 130 and the cutoff frequencies fc1 and fc2 set for the first high-pass filter 154 and the second high-pass filter 156. As with the first embodiment, the cutoff frequencies fc1 and fc2 are each raised according to an increase in the magnitude of the wind noise, while maintaining the relation fc1>fc2.

Specifically, in a range in which the wind noise magnitude is smaller than the minimum value MIN, the cutoff frequencies fc1 and fc2 are each set to the same value $f_{MIN}$. When the wind noise magnitude becomes greater than the minimum value MIN, the cutoff frequencies fc1 and fc2 are each raised, while maintaining the relation fc1>fc2. When the wind noise magnitude becomes greater than the maximum value MAX, the cutoff frequencies fc1 and fc2 are fixed to $f_{MAX1}$ and $f_{MAX2}$, respectively. It is needless to say that the cutoff frequency may be changed in a stepwise manner as shown in FIG. 3B.

The above is the configuration of the wind noise reducing circuit 100*a*. Next, description will be made regarding the operation thereof. The advantage of the wind noise reducing circuit 100*a* can be clearly understood in comparison with the high-pass filter 110 shown in FIG. 4.

The wind noise spectrum is equally included in the audio signals S3L and S3R. Similarly, the spectrum of the audio signal of interest is equally included in the audio signals S3L and S3R. Thus, in a case in which the high-pass filter 110 shown in FIG. 4 is used to reduce the wind noise, this involves a reduction of the audio signal of interest in the same spectrum range as that of the wind noise spectrum. That is to say, such an arrangement leads to a problem of undesired reduction of a low-frequency component of the audio signal of interest.

As described above in the first embodiment, the wind noise is included as a large part of the difference component of the audio signals S3L and S3R. In contrast, the audio signal of interest is included as a large part of the sum component of the audio signals S3L and S3R. With the second embodiment, by respectively providing the high-pass filters 154 and 156 to the difference component and the sum component, and by independently setting the cutoff frequencies fc1 and fc2 of the high-pass filters 154 and 156, such an arrangement is capable of appropriately reducing the wind noise spectrum included in the difference component without undesired reduction of the spectrum of the audio signal of interest included in the sum component.

Third Embodiment

Description has been made in the first and second embodiments regarding an arrangement in which the cutoff frequencies fc (fc1 and fc2) are each changed in a linear manner according to a change in the wind noise magnitude. The present inventors have investigated such a control operation, and have come to recognize the following problems. With the control operation shown in FIGS. 3A and 3B, or in FIG. 9, such an arrangement has a problem of discontinuous change in the rate at which the cutoff frequency is changed at the time point at which the cutoff frequency fc becomes grater than the minimum value $f_{MIN}$. Thus, when the magnitude of the wind noise changes such that it straddles the minimum value, this leads to a sudden change in the cutoff frequency fc, which causes the user to experience auditory discomfort with respect to the audio signal after it passes through the wind noise reducing circuit.

A third embodiment described below provides a technique which can be combined with the first or second embodiments.

Figure 10A:
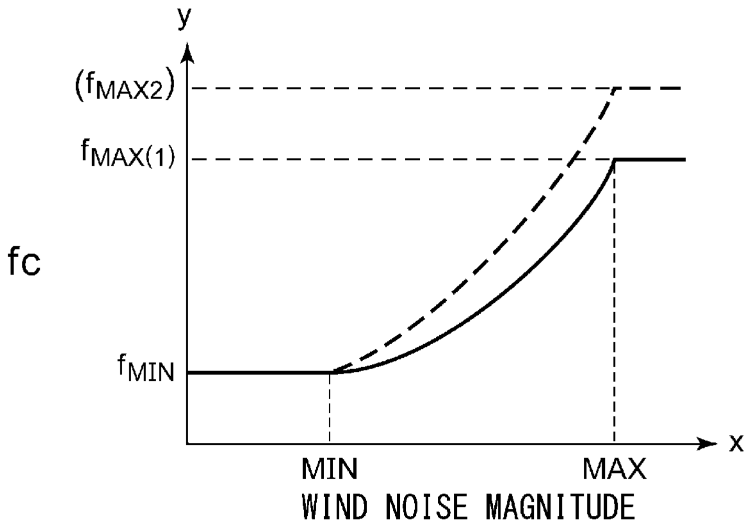
FIGS. 10A and 10B are diagrams each showing the wind noise magnitude and the cutoff frequency according to a third embodiment.
Figure 10B:
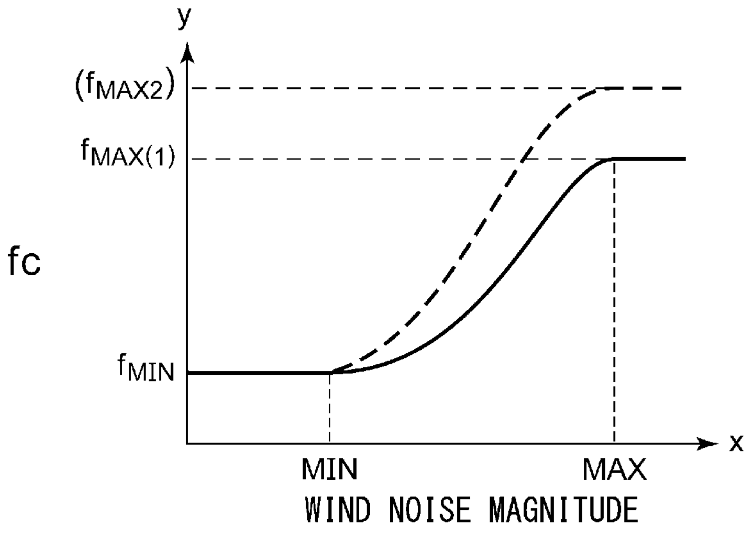

FIGS. 10A and 10B are diagrams each showing the relation between the wind noise magnitude x and the cutoff frequency y according to the third embodiment. In FIGS. 10A and 10B, the cutoff frequency is determined such that it is gradually raised in the vicinity of the minimum value MIN set for the wind noise magnitude x. In other words, the slope of the cutoff frequency dy/dx is determined such that it changes continuously in the vicinity of the minimum value MIN.

More specifically, the cutoff frequency y may be raised in a quadratic function manner according to an increase in the wind noise magnitude x, as shown in FIG. 10A. That is to say, the cutoff frequency may be determined such that the relation $y=a\cdot x^2+b$ holds true. Here, the symbols "a" and "b" each represent a parameter.

Also, the cutoff frequency y may be raised in an exponential function manner according to an increase in the wind noise magnitude x That is to say, the cutoff frequency may be determined such that the relation $y=a\cdot \exp^X+b$ holds true. Here, the symbols "a" and "b" each represent a parameter.

FIG. 10A shows an arrangement in which the cutoff frequency y is determined such that both the cutoff frequency y and the slope dy/dx are monotonically increased. In contrast, FIG. 10B shows an arrangement in which the cutoff frequency y is monotonically increased, but the slope of the cutoff frequency dy/dx is not monotonically increased. Specifically, in FIG. 10B, the slope dy/dx gradually increases, and subsequently gradually decreases.

With such an arrangement shown in FIG. 10A, the slope of the cutoff frequency y, i.e., the slope dy/dx, is discontinuous in the vicinity of the maximum value MAX. In contrast, with such an arrangement shown in FIG. 10B, the slope of the cutoff frequency y, i.e., the slope dy/dx, is continuous in the vicinity of the maximum value MAX.

The cutoff frequency characteristics shown in FIG. 10B may be determined using a trigonometric function, for example.

With the third embodiment, when the wind noise magnitude changes and straddles the minimum value MIN, such an arrangement provides a gradual change in the cutoff frequency fc, thereby reducing auditory discomfort experienced by the user.

While the preferred embodiments of the present invention have been described using specific terms, such description is for illustrative purposes only, and it is to be understood that changes and variations may be made without departing from the spirit or scope of the appended claims.

What is claimed is:

1. A wind noise reducing circuit configured to receive a first channel audio signal acquired via a first channel microphone and a second channel audio signal acquired via a second channel microphone, the wind noise reducing circuit comprising:

a high-pass filter configured to reduce a low-frequency component of the first channel audio signal and a low-frequency component of the second channel audio signal; and a control circuit configured to detect a wind noise magnitude based on at least one from among the first channel audio signal and the second channel audio signal, and to raise a cutoff frequency of the high-pass filter according to an increase in the wind noise magnitude thus detected, wherein the control circuit is configured to set the cutoff frequency of the high-pass filter to a predetermined minimum frequency $f_{MIN}$ when the wind noise magnitude is smaller than a predetermined minimum value MIN, and wherein the control circuit is configured to gradually raise the cutoff frequency when the wind noise magnitude becomes greater than the minimum value MIN, and a slope of the cutoff frequency gradually increases and subsequently gradually decreases with increasing the wind noise magnitude, and wherein the control circuit comprises a detection subtractor structured to generate a difference component of the first channel audio signal and the second channel audio signal, and to detect the wind noise magnitude based on the difference component thus generated.

2. The wind noise reducing circuit according to claim 1, configured to allow at least one from among the minimum value MIN and the minimum frequency $f_{MIN}$ to be set via an external circuit.

3. The wind noise reducing circuit according to claim 1, wherein the control circuit is configured to set the cutoff frequency of the high-pass filter to a predetermined maximum frequency $f_{MAX}$ when the wind noise magnitude is greater than a predetermined maximum value MAX.

4. The wind noise reducing circuit according to claim 3, configured to allow at least one from among the maximum value MAX and the maximum frequency $f_{MAX}$ to be set via an external circuit.

5. The wind noise reducing circuit according to claim 1, wherein the control circuit further comprises a detection adder configured to generate a sum component of the first channel audio signal and the second channel audio signal, and wherein the control circuit is configured to detect the wind noise magnitude based on the ratio between the difference component and the sum component thus generated.

6. The wind noise reducing circuit according to claim 1, wherein the high-pass filter comprises:

a first channel high-pass filter configured to remove a low-frequency component of the first channel audio signal; and a second channel high-pass filter configured to remove a low-frequency component of the second channel audio signal, and wherein the control circuit is configured to set the cutoff frequency of the first channel high-pass filter and a cutoff frequency of the second channel high-pass filter to equal values according to the wind noise magnitude.

7. The wind noise reducing circuit according to claim 1, wherein the high-pass filter comprises:

a first subtractor configured to generate a difference component of the first channel audio signal and the second channel audio signal;

a first adder configured to generate a sum component of the first channel audio signal and the second channel audio signal;

a first high-pass filter configured to remove a low-frequency component from the difference component generated by the first subtractor;

a second high-pass filter configured to remove a low-frequency component from the sum component generated by the first adder;

a second adder configured to generate the sum of an output signal of the first high-pass filter and an output signal of the second high-pass filter; and a second subtractor configured to generate the difference between an output signal of the first high-pass filter and an output signal of the second high-pass filter, and wherein the control circuit is configured to set the cutoff frequency of the first high-pass filter and a cutoff frequency of the second high-pass filter to respective values according to the wind noise magnitude.

8. The wind noise reducing circuit according to claim 7, wherein the control circuit is configured to set the cutoff frequency of the first high-pass filter to a value that is higher than the cutoff frequency of the second high-pass filter.

9. The wind noise reducing circuit according to claim 1, configured such that it is monolithically integrated on a single semiconductor substrate.

10. The wind noise reducing circuit according to claim 1, wherein a characteristics of the cutoff frequency is determined using a trigonometric function.

11. A wind noise reducing circuit configured to receive a first channel audio signal acquired via a first channel microphone and a second channel audio signal acquired via a second channel microphone, the wind noise reducing circuit comprising:

a high-pass filter configured to reduce a low-frequency component of the first channel audio signal and a low-frequency component of the second channel audio signal; and a control circuit configured to detect a wind noise magnitude based on at least one from among the first channel audio signal and the second channel audio signal, and to raise a cutoff frequency of the high-pass filter according to an increase in the wind noise magnitude thus detected, wherein the control circuit is configured to set the cutoff frequency of the high-pass filter to a predetermined minimum frequency $f_{MIN}$ when the wind noise magnitude is smaller than a predetermined minimum value MIN, and wherein the control circuit is configured to monotonically increase the cutoff frequency, and to increase the slope of the cutoff frequency from zero when the wind noise magnitude becomes greater than the minimum value MIN, and a slope of the cutoff frequency gradually increases and subsequently gradually decreases with increasing the wind noise magnitude, and wherein the control circuit comprises a detection subtractor structured to generate a difference component of the first channel audio signal and the second channel audio signal, and to detect the wind noise magnitude based on the difference component thus generated.

12. The wind noise reducing circuit according to claim 11, configured to allow at least one from among the minimum value MIN and the minimum frequency $f_{MIN}$ to be set via an external circuit.

13. The wind noise reducing circuit according to claim 11, wherein the control circuit is configured to set the cutoff frequency of the high-pass filter to a predetermined maximum frequency $f_{MAX}$ when the wind noise magnitude is greater than a predetermined maximum value MAX.

14. The wind noise reducing circuit according to claim 8, configured to allow at least one from among the maximum value MAX and the maximum frequency $f_{MAX}$ to be set via an external circuit.

15. The wind noise reducing circuit according to claim 11, wherein the control circuit further comprises a detection adder configured to generate a sum component of the first channel audio signal and the second channel audio signal, and wherein the control circuit is configured to detect the wind noise magnitude based on the ratio between the difference component and the sum component thus generated.

16. The wind noise reducing circuit according to claim 11, wherein the high-pass filter comprises:

a first channel high-pass filter configured to remove a low-frequency component of the first channel audio signal; and a second channel high-pass filter configured to remove a low-frequency component of the second channel audio signal, and wherein the control circuit is configured to set the cutoff frequency of the first channel high-pass filter and a cutoff frequency of the second channel high-pass filter to equal values according to the wind noise magnitude.

17. The wind noise reducing circuit according to claim 11, wherein the high-pass filter comprises:

a first subtractor configured to generate a difference component of the first channel audio signal and the second channel audio signal;

a first adder configured to generate a sum component of the first channel audio signal and the second channel audio signal;

a first high-pass filter configured to remove a low-frequency component from the difference component generated by the first subtractor;

a second high-pass filter configured to remove a low-frequency component from the sum component generated by the first adder;

a second adder configured to generate the sum of an output signal of the first high-pass filter and an output signal of the second high-pass filter; and a second subtractor configured to generate the difference between an output signal of the first high-pass filter and an output signal of the second high-pass filter, and wherein the control circuit is configured to set the cutoff frequency of the first high-pass filter and a cutoff frequency of the second high-pass filter to respective values according to the wind noise magnitude.

18. The wind noise reducing circuit according to claim 17, wherein the control circuit is configured to set the cutoff frequency of the first high-pass filter to a value that is higher than the cutoff frequency of the second high-pass filter.

19. The wind noise reducing circuit according to claim 11, configured such that it is monolithically integrated on a single semiconductor substrate.

20. The wind noise reducing circuit according to claim 11, wherein a characteristics of the cutoff frequency is determined using a trigonometric function.

21. A wind noise reducing circuit configured to receive a first channel audio signal acquired via a first channel microphone and a second channel audio signal acquired via a second channel microphone, the wind noise reducing circuit comprising:

a high-pass filter configured to reduce a low-frequency component of the first channel audio signal and a low-frequency component of the second channel audio signal; and a control circuit configured to detect a wind noise magnitude based on at least one from among the first channel audio signal and the second channel audio signal, and to raise a cutoff frequency of the high-pass filter according to an increase in the wind noise magnitude thus detected, wherein the control circuit is configured to set the cutoff frequency of the high-pass filter to a predetermined minimum frequency $f_{MIN}$ when the wind noise magnitude is smaller than a predetermined minimum value MIN, and wherein the control circuit is configured to increase the cutoff frequency in a quadratic function manner according to the wind noise magnitude when the wind noise magnitude becomes greater than the minimum value MIN, and a slope of the cutoff frequency gradually increases and subsequently gradually decreases with increasing the wind noise magnitude, and wherein the control circuit comprises a detection subtractor structured to generate a difference component of the first channel audio signal and the second channel audio signal, and to detect the wind noise magnitude based on the difference component thus generated.

22. The wind noise reducing circuit according to claim 21, configured to allow at least one from among the minimum value MIN and the minimum frequency $f_{MIN}$ to be set via an external circuit.

23. The wind noise reducing circuit according to claim 21, wherein the control circuit is configured to set the cutoff frequency of the high-pass filter to a predetermined maximum frequency $f_{MAX}$ when the wind noise magnitude is greater than a predetermined maximum value MAX.

24. The wind noise reducing circuit according to claim 23, configured to allow at least one from among the maximum value MAX and the maximum frequency $f_{MAX}$ to be set via an external circuit.

25. The wind noise reducing circuit according to claim 21, wherein the control circuit further comprises a detection adder configured to generate a sum component of the first channel audio signal and the second channel audio signal, and wherein the control circuit is configured to detect the wind noise magnitude based on the ratio between the difference component and the sum component thus generated.

26. The wind noise reducing circuit according to claim 21, wherein the high-pass filter comprises:

a first channel high-pass filter configured to remove a low-frequency component of the first channel audio signal; and a second channel high-pass filter configured to remove a low-frequency component of the second channel audio signal, and wherein the control circuit is configured to set the cutoff frequency of the first channel high-pass filter and a cutoff frequency of the second channel high-pass filter to equal values according to the wind noise magnitude.

27. The wind noise reducing circuit according to claim 21, wherein the high-pass filter comprises:

a first subtractor configured to generate a difference component of the first channel audio signal and the second channel audio signal;

a first adder configured to generate a sum component of the first channel audio signal and the second channel audio signal;

a first high-pass filter configured to remove a low-frequency component from the difference component generated by the first subtractor;

a second high-pass filter configured to remove a low-frequency component from the sum component generated by the first adder;

a second adder configured to generate the sum of an output signal of the first high-pass filter and an output signal of the second high-pass filter; and a second subtractor configured to generate the difference between an output signal of the first high-pass filter and an output signal of the second high-pass filter, and wherein the control circuit is configured to set the cutoff frequency of the first high-pass filter and a cutoff frequency of the second high-pass filter to respective values according to the wind noise magnitude.

28. The wind noise reducing circuit according to claim 27, wherein the control circuit is configured to set the cutoff frequency of the first high-pass filter to a value that is higher than the cutoff frequency of the second high-pass filter.

29. The wind noise reducing circuit according to claim 21, configured such that it is monolithically integrated on a single semiconductor substrate.

30. The wind noise reducing circuit according to claim 21, wherein a characteristics of the cutoff frequency is determined using a trigonometric function.

31. An audio signal processing circuit comprising:

a first amplifier configured to amplify an output signal of a first channel microphone;

a second amplifier configured to amplify an output signal of a second channel microphone;

a first A/D converter configured to convert an output signal of the first amplifier into a first channel audio signal in the form of a digital signal;

a second A/D converter configured to convert an output signal of the second amplifier into a second channel audio signal in the form of a digital signal;

the wind noise reducing circuit according to claim 1, configured to receive the first channel audio signal and the second channel audio signal, and to reduce a wind noise; and a digital signal processing unit configured to perform predetermined signal processing on the first channel audio signal and the second channel audio signal after they pass through the wind noise reducing circuit.

32. An electronic device comprising the audio signal processing circuit according to claim 31.

33. An audio signal processing circuit comprising:

a first amplifier configured to amplify an output signal of a first channel microphone;

a second amplifier configured to amplify an output signal of a second channel microphone;

a first A/D converter configured to convert an output signal of the first amplifier into a first channel audio signal in the form of a digital signal;

a second A/D converter configured to convert an output signal of the second amplifier into a second channel audio signal in the form of a digital signal;

the wind noise reducing circuit according to claim 11, configured to receive the first channel audio signal and the second channel audio signal, and to reduce a wind noise; and a digital signal processing unit configured to perform predetermined signal processing on the first channel audio signal and the second channel audio signal after they pass through the wind noise reducing circuit.

34. An electronic device comprising the audio signal processing circuit according to claim 33.

35. An audio signal processing circuit comprising:

a first amplifier configured to amplify an output signal of a first channel microphone;

a second amplifier configured to amplify an output signal of a second channel microphone;

a first A/D converter configured to convert an output signal of the first amplifier into a first channel audio signal in the form of a digital signal;

a second A/D converter configured to convert an output signal of the second amplifier into a second channel audio signal in the form of a digital signal;

the wind noise reducing circuit according to claim 21, configured to receive the first channel audio signal and the second channel audio signal, and to reduce a wind noise; and a digital signal processing unit configured to perform predetermined signal processing on the first channel audio signal and the second channel audio signal after they pass through the wind noise reducing circuit.

36. An electronic device comprising the audio signal processing circuit according to claim 35.

37. A wind noise reducing method for reducing wind noise included in a first channel audio signal acquired via a first channel microphone and wind noise included in a second channel audio signal acquired via a second channel microphone, the wind noise reducing method comprising:

reducing a low-frequency component of the first channel audio signal and a low-frequency component of the second channel audio signal by means of a high-pass filter;

detecting a wind noise magnitude based on at least one from among the first channel audio signal and the second channel audio signal;

setting a cutoff frequency of the high-pass filter to a predetermined minimum frequency $f_{MIN}$ when the wind noise magnitude is smaller than a minimum value MIN; and gradually increasing the cutoff frequency when the wind noise magnitude becomes greater than the minimum value MIN, wherein a slope of the cutoff frequency gradually increases and subsequently gradually decreases with increasing the wind noise magnitude.

38. A wind noise reducing method for reducing wind noise included in a first channel audio signal acquired via a first channel microphone and wind noise included in a second channel audio signal acquired via a second channel microphone, the wind noise reducing method comprising:

reducing a low-frequency component of the first channel audio signal and a low-frequency component of the second channel audio signal by means of a high-pass filter;

detecting a wind noise magnitude based on at least one from among the first channel audio signal and the second channel audio signal;

setting a cutoff frequency of the high-pass filter to a predetermined minimum frequency $f_{MIN}$ when the wind noise magnitude is smaller than a minimum value MIN; and monotonically increasing the cutoff frequency when the wind noise magnitude becomes greater than the minimum value MIN, and increasing the slope of the cutoff frequency from zero, wherein a slope of the cutoff frequency gradually increases and subsequently gradually decreases with increasing the wind noise magnitude.

39. A wind noise reducing method for reducing wind noise included in a first channel audio signal acquired via a first channel microphone and wind noise included in a second channel audio signal acquired via a second channel microphone, the wind noise reducing method comprising:

reducing a low-frequency component of the first channel audio signal and a low-frequency component of the second channel audio signal by means of a high-pass filter;

detecting a wind noise magnitude based on at least one from among the first channel audio signal and the second channel audio signal;

setting a cutoff frequency of the high-pass filter to a predetermined minimum frequency $f_{MIN}$ when the wind noise magnitude is smaller than a minimum value MIN; and increasing the cutoff frequency in a quadratic function manner according to the wind noise magnitude when the wind noise magnitude becomes greater than the minimum value MIN, wherein a slope of the cutoff frequency gradually increases and subsequently gradually decreases with increasing the wind noise magnitude.

* * * * *